United States Patent [19]
Fletcher

[11] Patent Number: 5,297,012
[45] Date of Patent: Mar. 22, 1994

[54] PYRAMIDAL SIGNAL LIGHT

[76] Inventor: Arthur L. Fletcher, 34945 Cella La., Yucaipa, Calif. 92399

[21] Appl. No.: 948,105

[22] Filed: Sep. 21, 1992

[51] Int. Cl.$^5$ ............................. F21Q 3/00; F21N 7/04
[52] U.S. Cl. ..................................... 362/252; 362/235;
362/301; 362/311; 362/367; 362/398; 362/404;
362/806; 362/811
[58] Field of Search ............... 362/252, 301, 311, 346,
362/360, 367, 398, 407, 811, 806, 235, 404, 408,
329, 297, 298

[56] References Cited

U.S. PATENT DOCUMENTS

| | | | |
|---|---|---|---|
| 1,106,135 | 8/1914 | Dawes | 362/363 |
| 3,610,918 | 10/1961 | Barlow | 362/811 |
| 3,611,603 | 6/1969 | Gesner, III | 362/806 |
| 3,811,041 | 5/1974 | Matsushita | 362/811 |
| 4,164,823 | 8/1979 | Marsico | 362/811 |
| 4,922,348 | 5/1990 | Torrence | 362/806 |
| 5,043,855 | 8/1991 | Yelvington | 362/367 |
| 5,128,850 | 7/1972 | Juodvalkis | 362/398 |

*Primary Examiner*—Richard R. Cole
*Assistant Examiner*—L. Heyman
*Attorney, Agent, or Firm*—Leon Gilden

[57] ABSTRACT

A pyramidal signal light includes a translucent base panel and triangular side panels having reflective interior surfaces, with each of the translucent panels having at their intersection adjacent panels and an array of light members. In this manner, reflective illumination within the structure projected exteriorly thereof is visible in a unique projection of illumination.

3 Claims, 4 Drawing Sheets

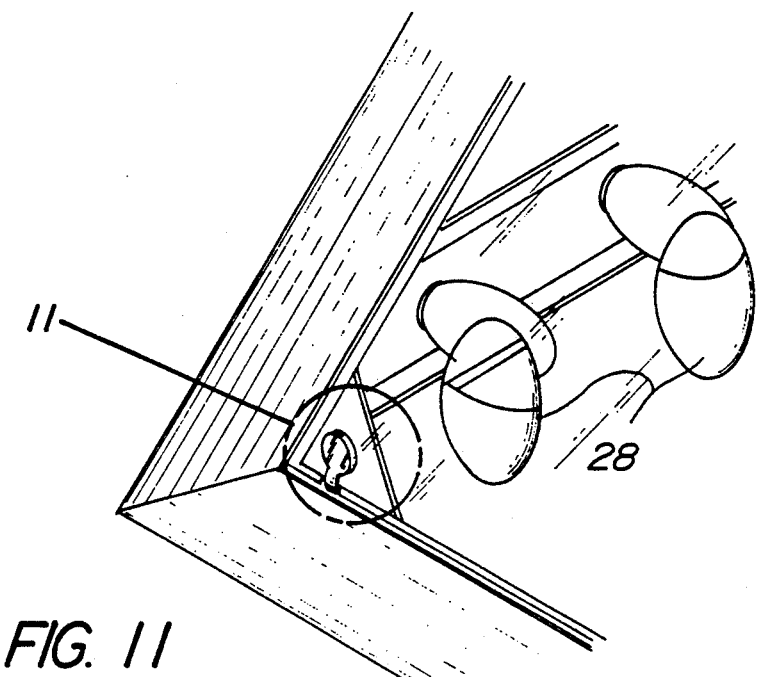
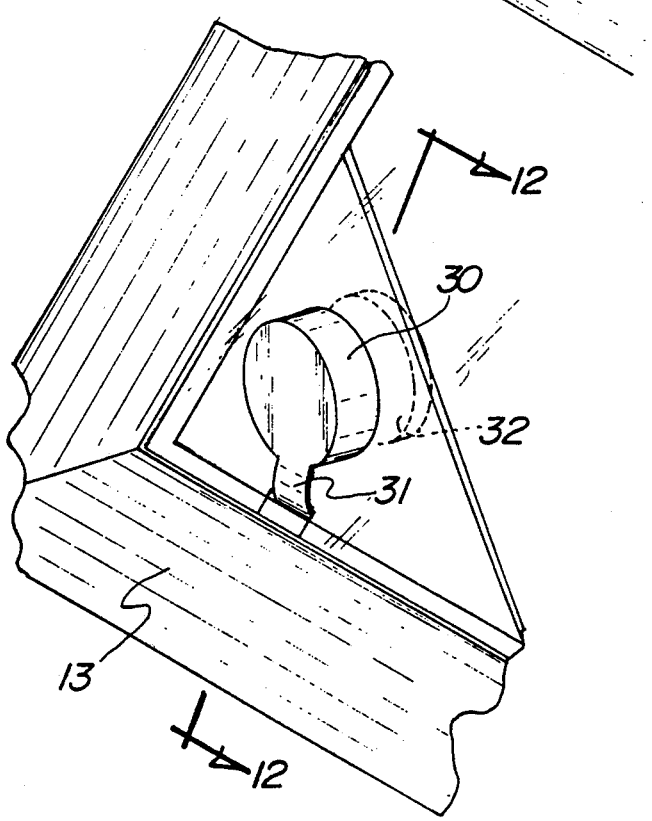
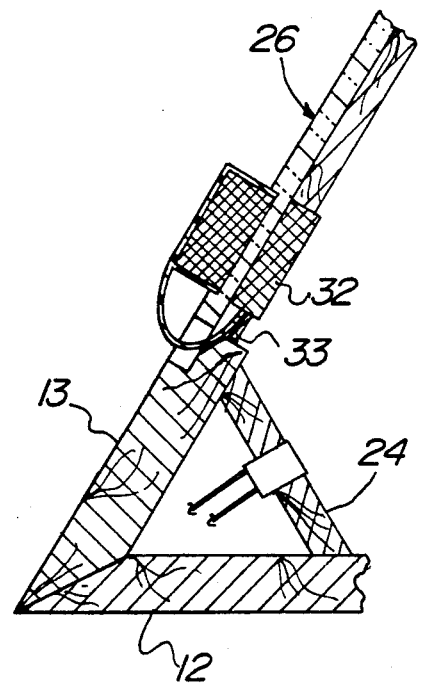

PYRAMIDAL SIGNAL LIGHT

BACKGROUND OF THE INVENTION

1. Field of the Invention

The field of invention relates to signal light structure, and more particularly pertains to a new and improved pyramidal signal light where the same utilizes a pyramidal shape having oriented arrays of light members therewithin to project light in a unique and visibly distinctive manner.

2. Description of the Prior Art

Signal lights of various types have been utilized throughout the prior art, wherein the instant invention attempts to address deficiencies of the prior art by providing for a unique signal structure arranged for the entertainment as well as aesthetically appealing impact to individuals. Prior art decorative light structure is indicated in the U.S. Pat. Nos. 4,947,299; 4,017,729; 3,462,632; and 4,399,494.

The instant invention overcomes deficiencies of prior art decorative and uniquely configured lamp structure to provide for the pyramidal structure to enhance reflected illumination within the light and project such illumination for ease of viewing and recognition to individuals.

SUMMARY OF THE INVENTION

In view of the foregoing disadvantages inherent in the known types of signal light apparatus now present in the prior art, the present invention provides a pyramidal signal light wherein the same is addressed for the entertainment and alerting of individuals as to the orientation of the light structure of the instant invention. As such, the general purpose of the present invention, which will be described subsequently in greater detail, is to provide a new and improved pyramidal light signal which has all the advantages of the prior art signal light apparatus and none of the disadvantages.

To attain this, the present invention provides a pyramidal signal light including a translucent base panel and triangular side panels having reflective interior surfaces, with each of the translucent panels having at their intersection adjacent panels and an array of light members. In this manner, reflective illumination within the structure projected exteriorly thereof is visible in a unique projection of illumination.

My invention residues not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pyramidal signal light which has all the advantages of the prior art signal light apparatus and none of the disadvantages.

It is another object of the present invention to provide a new and improved pyramidal signal ight which may be easily and efficiently manufactured and marketed.

It is a further object of the present invention to provide a new and improved pyramidal signal light which is of a durable and reliable construction.

An even further object of the present invention is to provide a new and improved pyramidal signal light which is susceptible of a low cost of manufacture with regard to both materials and labor, and which accordingly is then susceptible of low prices of sale to the consuming public, thereby making such pyramidal signal light economically available to the buying public.

Still yet another object of the present invention is to provide a new and improved pyramidal signal light which provides in the apparatus and methods of the prior art some of the advantages thereof, which simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCIRPTION OF THE DRAWINGS

The invention will be better understood and objects other than those set forth above will become apparent when consideration is given to the following detailed description thereof. Such description makes reference to the annexed drawings wherein:

FIG. 10 is an exemplary construction of the invention in the mounting of the panels as set forth in the FIGS. 6 and 8.

FIG. 11 is an enlarged isometric illustration of section 11 as set forth in FIG. 10.

FIG. 12 is an orthographic view, taken along the lines 12—12 of FIG. 11 in the direction indicated by the arrows.

DESCRIPTION OF THE PREFERRED EMBODIMENT

Figure 1:
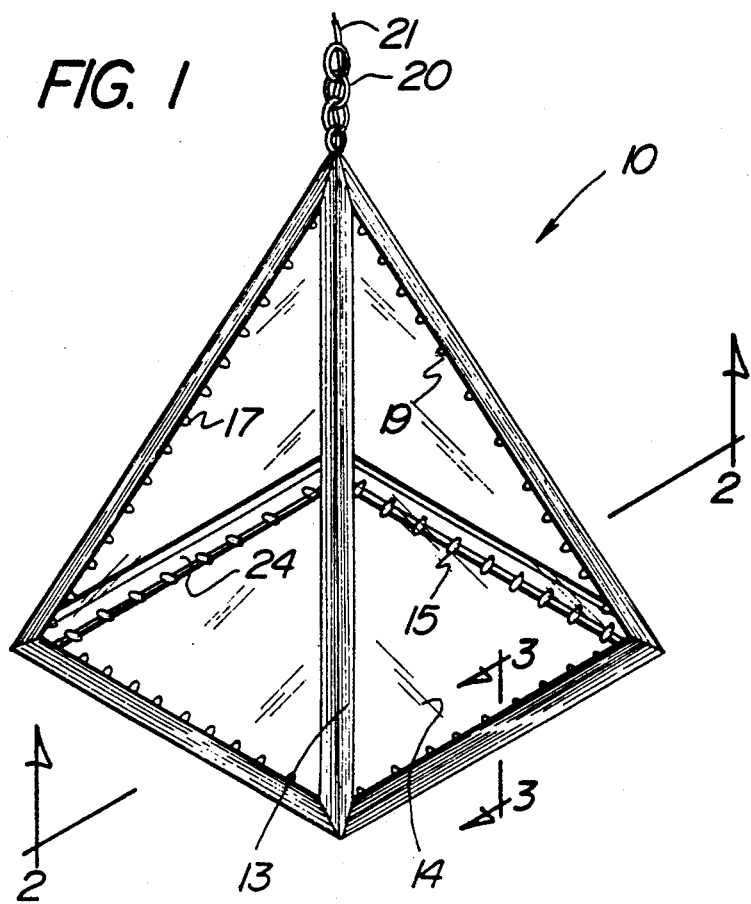
FIG. 1 is an isometric illustration of the instant invention.

With reference now to the drawings, and in particular to FIGS. 1 to 12 thereof, a new and improved pyramidal signal light embodying the principles and concepts of the present invention and generally designated by the reference numeral 10 will be described.

Figure 2:
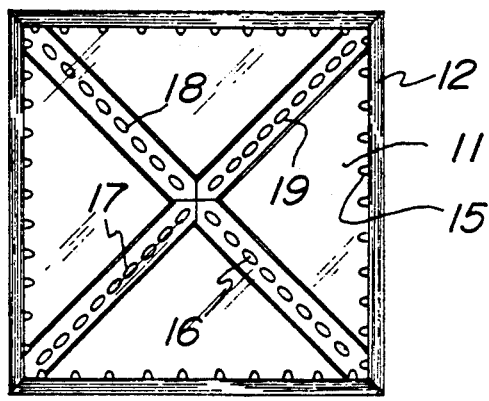
FIG. 2 is an orthographic view, taken along the lines 2—2 of FIG. 1 in the direction indicated by the arrows.
Figure 3:
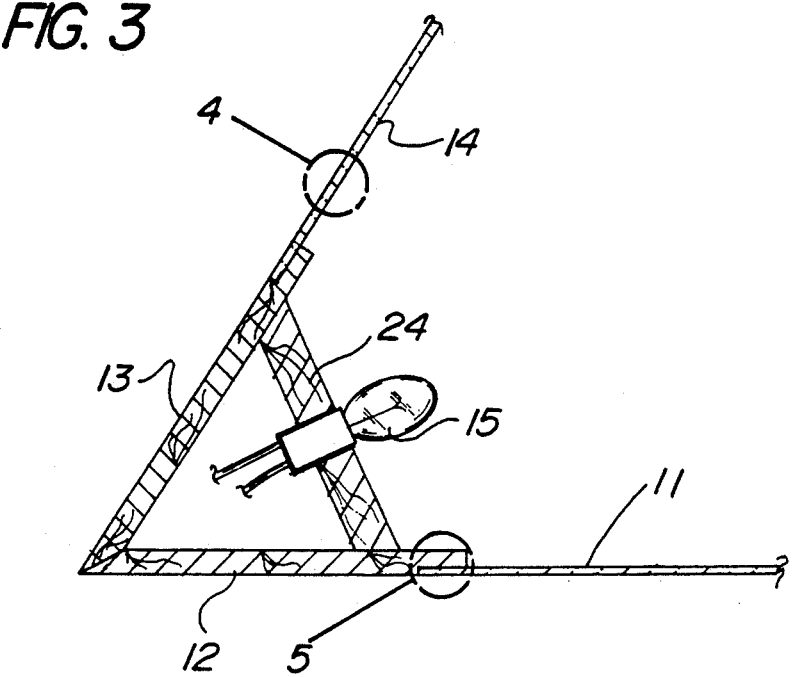
FIG. 3 is an orthographic view, taken along the lines 3—3 of FIG. 1 in the direction indicated by the arrows.
Figure 4:
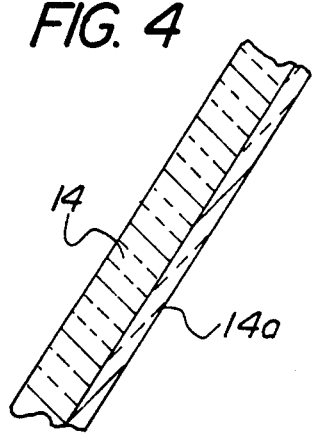
FIG. 4 is an orthographic view of section 4 as set forth in FIG. 3.
Figure 5:
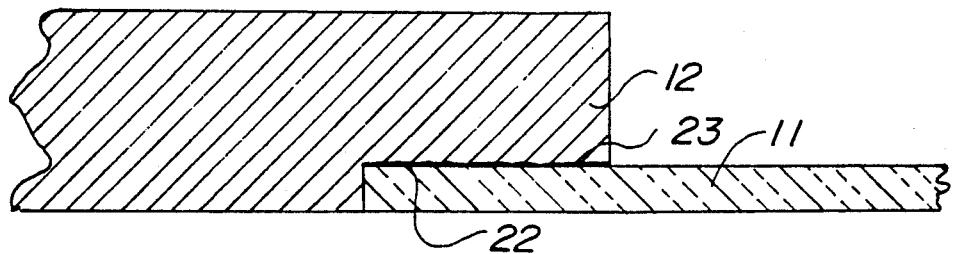
FIG. 5 is an orthographic view of section 5 as set forth in FIG. 3.

More specifically, the pyramidal signal ight 10 of the instant invention essentially comprises a translucent square base floor palte 11 having a square base frame 12 in surrounding relationship thereto. Three equilateral frames 13, wherein the frames may optionally be formed as an isosceles triangular configuration, each include a translucent panel 14 having a reflective interior layer 14a (see FIG. 4) mounted within each of the frames 13, wherein the reflective layer 14 permits transmission of light therethrough to provide for a glowing effect from the light structure 10, wherein such glowing is directed through the translucent panels to create a desired aura of light. A first light array 15 is mounted within the signal light structure 10, and more particularly coextensively along the base frame 12. A second, third, fourth, and fifth light array 16, 17, 18, and 19 respectively are directed at each intersection of each of the frames 13, as indicated in FIG. 2. A support cable 20 ismounted to the apex of the pyramidal configuration, with an electric cable directed therethrough for providing electrical energy to the various light arrays. Mounting of the light arrays is exemplified in FIG. 3, wherein a reinforcing web 24 is mounted between adjacent frames, as well as within the base frame 12, to enhance rigidity and positioning of the various light arrays formed of individual incandescent light members.

The panels are mounted as indicated within a recess 22 of a frame typically utilizing adhesive 23.

Figure 6:
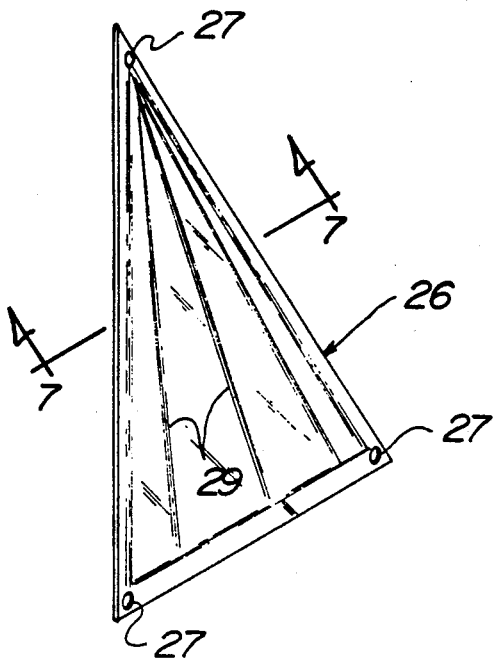
FIG. 6 is an isometric illustration of a modified triangular panel structure.
Figure 8:
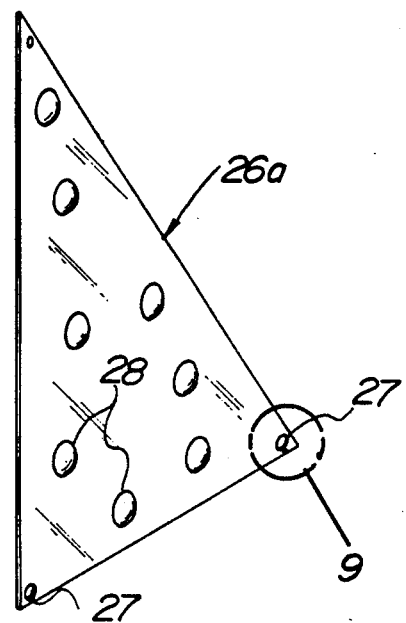
FIG. 8 is an isometric illumination of a further modified panel structure.
Figure 7:
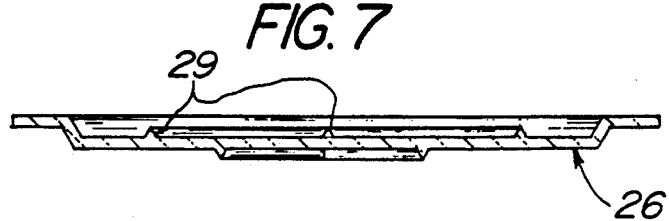
FIG. 7 is an orthographic view, taken along the lines 7—7 of FIG. 6 in the direction indicated by the arrows.
Figure 9:
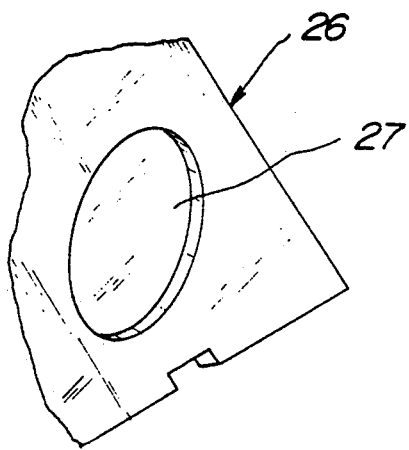
FIG. 9 is an enlarged isometric illustration of section 9 as set forth in FIG. 8.

The FIGS. 6 and 8 indicate modified panels 26 and 26a, wherein the panel 26 includes ribs 29 for light distortion and enhancing the ease of viewing of the structure in a distinctive manner, wherein the panel 26a utilizes a matrix of randomly positioned magnification lenses 28 mounted within the panel structure 26a. Each of the modified panels 26 and 26a include at each corner of the triangular structure a cylindrical recess 27. Mounting of the lenses at each corner thereof is accomplished by each corner of each of the frames 13 having a first magnet 30 mounted to a flexible mounting web 31, with a second magnet 32 mouted upon a support 33 within the light structure. In this manner, the first magnet 30 is received and positioned within a respective cylindrical recess 27 for alignment with the second magnet 32. Ease of replacement of the panels is accomplished by displacing the first magnets 30 from each corner of each panel 26 to permit utilizing various panels in any desired manner. It should be noted that the first and second magnets 30 and 32 are of opposite polarity for attraction relative to one another and are aligned relative to one another when the panel is mounted within a respective frame, as indicated in FIG. 12.

As to the manner of usage and operation of the instant invention, the same should be apparent from the above disclosre, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modificatons and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pyramidal signal light, comprising,
    a square base frame having a translucent floor plate contained therewithin, and
    four isosceles frames, with each of the isosceles frames contiguously and integrally mounted to the base frame and the four isosceles frames secured together to form a pyramidal housing, and
    each of the isosceles frames having a translucent panel mounted therewithin, and
    a support cable mounted to an apex of the housing spaced from the base frame, and
    a first light arrays mounted within the housing coextensively within the base frame, and four second light array extending from the base frame to the apex within the housing, and each of the light arrays in electrical communication relative to one another, and electrical power supply cord directed through the support cable directed to each light array, and the base frame including a continuous reinforcing web mounting the first light array, and each intersection of said four isosceles frames including a further reinforcing web extending between adjacent of said isosceles frames, and each of the reinforcing webs mounting one of said light arrays.

2. A signal light as set forth in claim 1 wherein each translucent panel includes a reflective interior surface directed within the housing, and at least one of said translucent panels includes a plurality of magnification lenses for distortion and enhancement of illumination from within the housing.

3. A signal light as set forth in claim 2 wherein each of the lenses includes a cylindrical recess adjacent each apex of each lens, and each isosceles frame includes a plurality of first magnets mounted adjacent each corner of each isosceles frame, and each first magnet mounted within a respective cylindrical recess, and each isosceles frame includes a second magnet mounted within the housing aligned with the first magnet, with the second magnet fixedly mounted within the housing.

* * * * *